April 5, 1960   W. HAHN ET AL   2,931,285
COCKING DEVICE FOR PHOTOGRAPHIC BETWEEN THE LENS SHUTTER
Filed Nov. 29, 1955   3 Sheets-Sheet 3

WERNER HAHN
HEINZ SCHULZE
ROLF NOACK
INVENTORS
BY Irwin S. Thompson
ATTORNEY ated Apr. 5, 1960

2,931,285

COCKING DEVICE FOR PHOTOGRAPHIC BETWEEN THE LENS SHUTTER

Werner Hahn, Heinz Schulze, and Rolf Noack, Dresden, Germany, assignors to VEB Kamera- und Kinowerke Dresden, a corporation of Germany Application November 29, 1955, Serial No. 549,638

3 Claims. (Cl. 95—63)

The present invention relates to a photographic objective shutter with a plurality of members which are brought into the position of preparedness on the cocking of the shutter, one of these members serving as cocking member.

As is known, pre-timer mechanisms, contact escapements, spring diaphragms, etc., built into shutters often posses their own force-storing means, which must be cocked on the conversion of the shutters into the position of preparedness. In view of the fact that the shutters are to be operated with the fewest possible manual operations, arrangements have already been provided on shutters permitting simultaneous cocking of a plurality of force-storing means. Some of these arrangements have additional members serving exclusively for this purpose. Their disadvantage consists in that, firstly, due to the additional arrangement of members and also by the construction, for example, as cam controlled pawls, they make the shutter mechanism complicated and furthermore make the shutter more expensive. Other known arrangements use elements which are already to be cocked in any case, as cocking members and which drive the other members, through projections, into the cocking position. However, these arrangements have the disadvantage that the running off of the simultaneously cocked members is subject to the maintenance of chronological sequence.

It is the task of the present invention to provide a simple and reliably operating arrangement for the simultaneous cocking of a plurality of force-storing means.

This is achieved, in accordance with the invention, due to the fact that upon the cocking member there is movably arranged an element, which as a result of its relative movement in relation to the said cocking member at the commencement of the cocking operation, constitutes a coupling between members to be cocked and at the end of the cocking operation, disengages this coupling again. Before the actual cocking operation, the element, preferably constructed as a handle, carries out a relative movement, during which the coupling elements are brought into engagement with one another. The relative movement of the handle is expediently limited by stops on the cocking member. Apart from the simple arrangement obtained without complicated means the advantage is obtained that the cocked shutter members can be allowed to run off in any desired sequence. Further details of the invention may be seen from the examples of embodiment described and illustrated hereinafter.

Figure 1:
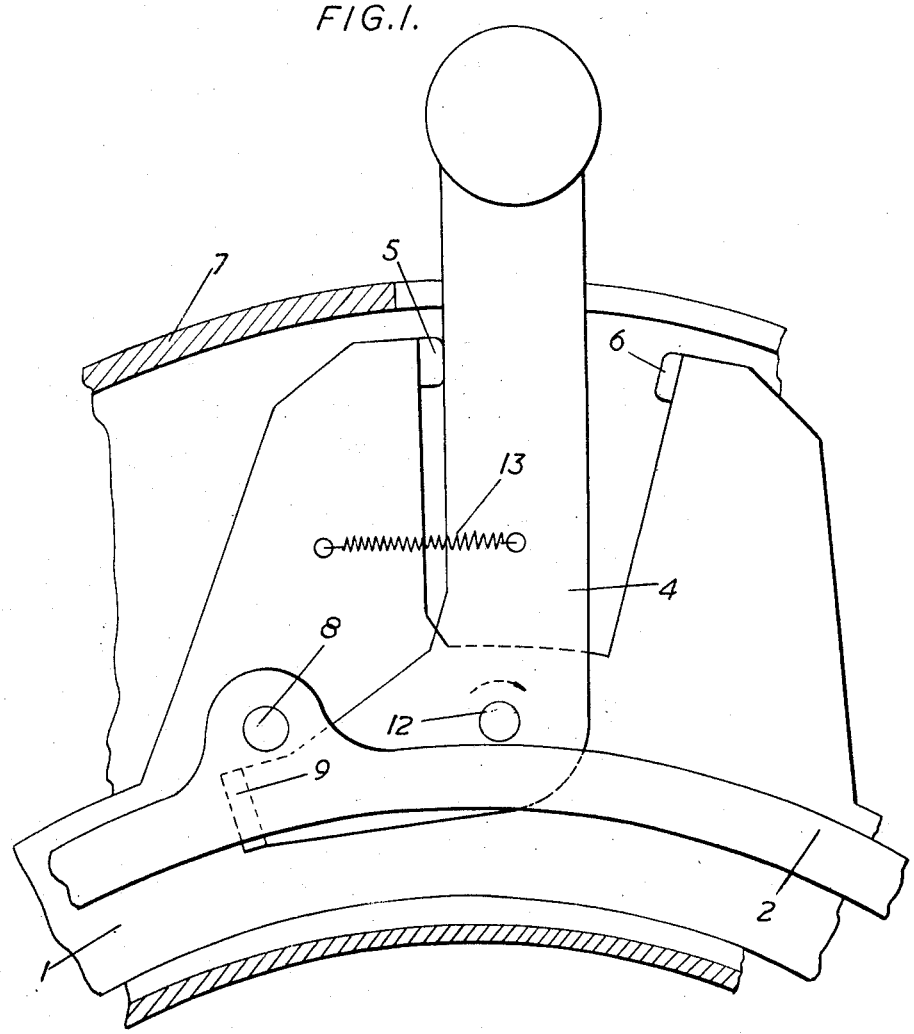
Figure 1 represents a handle rotatably mounted on the cocking member in the rest position, provided for the cocking of a further member.

In the drawings a first or cocking ring 1 is shown which is provided for the cocking of a shutter whose elements 22 (one shown for simplicity only in Figure 3) are mounted on pivots 23 on a fixed ring 24. The segments are capable of being driven about the pivots 23 by pins 25 mounted on a second or an element driving ring 2, which engage in slots 26 in order to effect opening and closing of the shutter for exposure. However, the means for opening and closing and the way in which this is done are not pertinent to the invention as disclosed herein.

The cocking ring 1 is rotatably arranged in the housing 7 and carries the handle 4 (Figures 1 and 3) or 41 (Figure 2) pivotable about the pivot point 12. For the limitation of the relative movement that is to say of the travel of the handle 4 or 41 about the pivot point 12, stops 5 and 6 lying in the path of the handle 4 or 41 are provided on the main cocking ring 1. The spring 13 arranged between the main cocking ring 1 and the handle 4 or 41 seeks always to move the handle into a position in which the coupling between the handle and the members 2 or 2 and 3 to be cocked is disengaged. The members 2 or 2 and 3 mounted outside of the main cocking ring 1 in the shutter housing 7 and to be cocked on conversion of the shutter into the position of preparedness possess pins 8 or 8 and 11 with which the lugs 9 or 9 and 10 of the handles 4 or 41 co-operate.

If the shutter is to be brought into the position of preparedness, the handle 4 is grasped at the end projecting out of the shutter housing 7 and moved in the clockwise direction. The relative rotation about the pivot point 12 thereby takes place in the direction of the arrow against the action of the spring 13 and has the result that the lug 9 of the handle 4 comes to lie behind the pin 8 arranged on the member 2 to be cocked or that (Figure 2) also the second lug 10 provided on the handle 41 lies behind the pin 11 arranged on the member 3 which is also to be cocked. After termination of the relative rotation of the handle 4 or 41 about the pivot point 12, on continued rotation of the end of the handle 4 or 41 projecting out of the shutter housing 7, all the shutter members 1, 2 or 1, 2 and 3 to be cocked simultaneously are driven in the direction of the arrow against the actions of their force-storing means (for example through the drive springs 14, 15, shown in Figure 3) through the stop 6 and the pins 8 or 8 and 11. Towards the end of the cocking movement, the cocked members 1, 2 or 1, 2 and 3, are held in their cocked positions by catch elements of known construction (16, 17 in Figure 3). In this position of the members, the handle 4 or 41 and the members 2 or 2 and 3 are disengaged due to the action of the spring 13.

Figure 3:
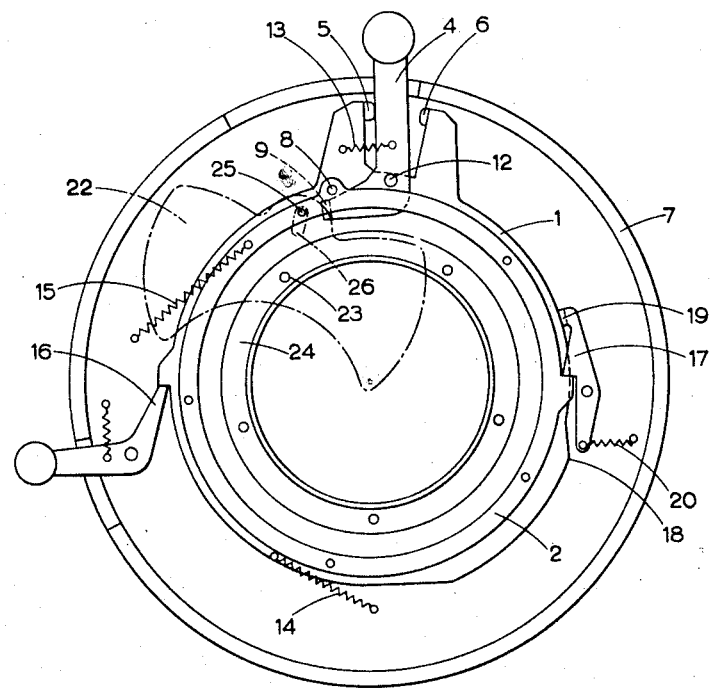
Figure 3 shows the opened housing of a shutter with the installed cocking arrangement.

Figure 3 shows the arrangement of the cocking arrangement in a shutter. Therein the cocking ring 1 and the element driving ring 2 are mounted about the shutter aperture. The springs 14 and 15 serve for the drive of the said rings. In the cocking position the cocking ring 1 is held by the release lever 16 and the ring 2 by the pawl 17. When the release lever 16 is actuated directly, the pawl 17 is released by the cocking ring 1 as it runs off, and the cam 18 strikes against the lug 19 which rotates the pawl 17 in the clockwise direction against the action of the spring 20. When the pawl 17 is rotated by the cam 18, the ring 2 is freed and rotates under the action of the spring 15 so as to drive the shutter segments about their pivots by means of the pins 25, thereby effecting opening and closing of the shutter.

Figure 2:
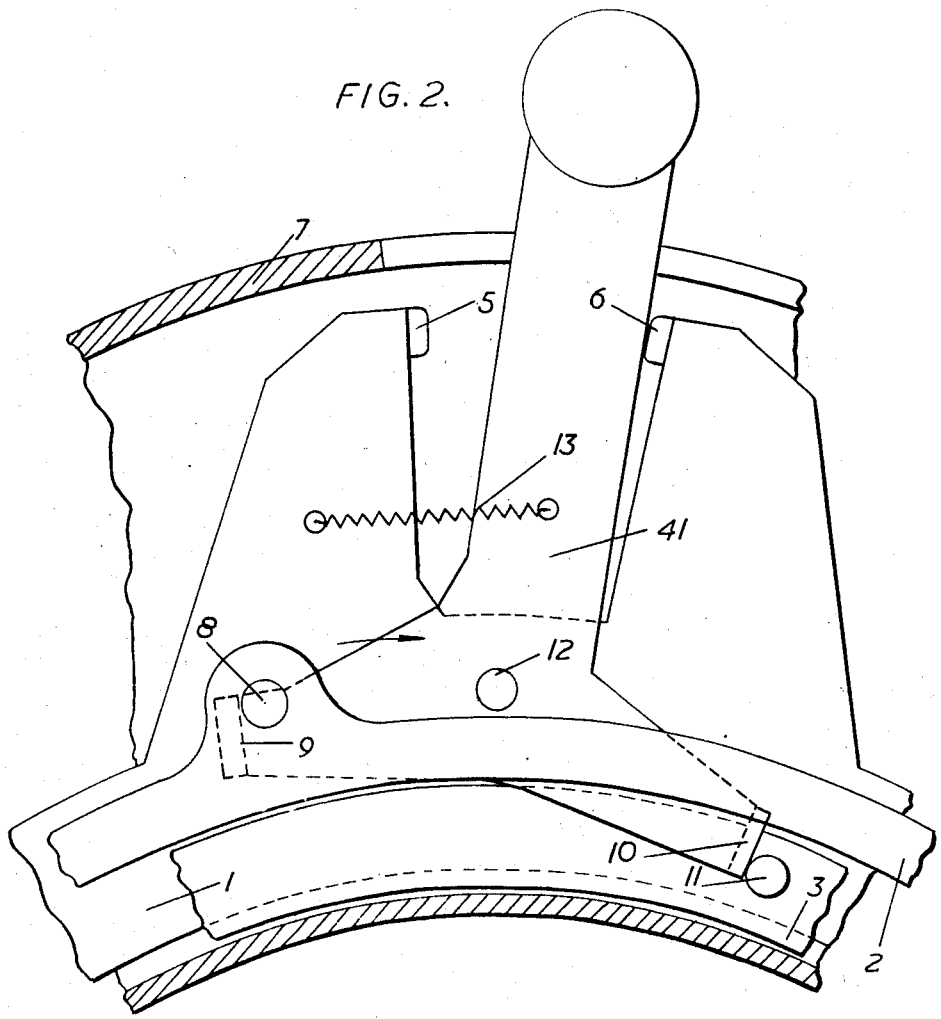
Figure 2 represents a handle rotatably mounted on the cocking member, after carrying out the relative movement, which is intended for the cocking of two further members.

According to Figure 2, the handle 41, due to suitable construction, can also serve for the cocking of a ring 3. In this example the ring 3 serves for the drive of an escapement (not shown).

The invention as described in the above examples, is applied to photographic shutters having a housing in which a plurality of rotatable rings are mounted, said rings being rotated in the same direction as each other by driving springs connected with their first ends to the housing and their second ends to each of said driving rings respectively. This arrangement for driving the rings of the shutter by means of springs is already previously known and an example may be seen in United States specification No. 2,710,568 which shows a ring 12 rotatable by means of a driving spring 16. Moreover, it is also well known to hold the rings in a cocked position by catch elements, such as pawls, and this too can be seen from the reference mentioned. The latch 18 holds the ring 12 by the release shoulder 22 engaging the abutment 24 when the ring 12 is in the cocked position as shown in Figure 2 of the drawings of the reference.

We claim:

1. In a photographic shutter device comprising a housing, a first cocking ring rotatably mounted within the housing, a second ring also rotatably mounted within the housing, said rings being concentric and movable from their positions of rest to cocked positions against force-storing means, and catch elements for holding the rings respectively in their cocked positions, the improvement comprising a lever pivotably mounted on the said first ring having a plurality of extremities and projecting with a first extremity out of the housing, a projection mounted on said second ring, two stops on said first ring lying one on each side of the lever and in the path of movement of said lever, means on a second extremity of said lever which is engageable with said projection in order to couple the first and second rings together whereupon rotation of the lever on its pivotal axis brings the means on the second extremity into engagement with the projection and movement of the lever in relation to the housing effects simultaneous cocking of the first and second rings, and a spring connected with one end to said first ring and with the other end to said lever for rotating the lever on release thereof to disengage the means on the second extremity from the first projection.

2. In a photographic shutter comprising a housing, first, second and third rings rotatably mounted within the housing, said rings being concentric and movable from their positions of rest to cocked positions against force storing means, and catch elements for holding the rings respectively in their cocked positions, the improvement comprising a lever rotatably mounted on the first ring having a plurality of extremities and projecting with a first extremity out of the housing, a first projection mounted on said second ring, a second projection mounted on said third ring, means on a second extremity of said lever which is engageable with said first projection in order to couple the first and second rings together, means on a third extremity of said lever which is engageable with said second projection in order to couple the first and third rings together whereupon rotation of the lever on its pivotal axis brings the means on the second and third extremities into engagement with said first and second projections respectively and movement of the lever in relation to the housing affects simultaneous cocking of said rings, and a spring connected with one end to said first ring and with the other end to said first extremity for rotating the lever on release thereof to disengage the means on the second and third extremities from the first and second projections.

3. A photographic shutter as claimed in claim 2, wherein the means on the second and third extremities are in the form of lugs and said projections on said second and third rings are pins.

References Cited in the file of this patent

UNITED STATES PATENTS

| 2,382,623 | Fuerst | Aug. 14, 1945 |
| 2,710,568 | Braun | June 14, 1955 |